(12) United States Patent
Huang

(10) Patent No.: US 10,944,616 B1
(45) Date of Patent: Mar. 9, 2021

(54) METHOD FOR ESTIMATING SAMPLING FREQUENCY OFFSET OF RECEIVER, AND ASSOCIATED SIGNAL PROCESSING METHOD AND RECEIVER

(71) Applicant: Realtek Semiconductor Corp., HsinChu (TW)

(72) Inventor: Wen-Yu Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/828,934

(22) Filed: Mar. 24, 2020

(51) Int. Cl.
*H04L 7/04* (2006.01)
*H04L 27/26* (2006.01)
*H04L 5/00* (2006.01)

(52) U.S. Cl.
CPC ........ *H04L 27/2695* (2013.01); *H04L 5/0048* (2013.01); *H04L 27/2659* (2013.01); *H04L 27/2663* (2013.01); *H04L 27/2675* (2013.01)

(58) Field of Classification Search
CPC ............ H04L 27/2695; H04L 27/2659; H04L 5/0048; H04L 27/2675; H04L 27/2663; H04L 27/2613
USPC .......................... 375/362, 343, 344–347, 369
See application file for complete search history.

(56) References Cited

U.S. PATENT DOCUMENTS

2019/0104009 A1\* 4/2019 Fan ..................... H04L 27/2613

\* cited by examiner

*Primary Examiner* — Phuong Phu
(74) *Attorney, Agent, or Firm* — Winston Hsu

(57) ABSTRACT

The present invention provides a method for estimating a sampling frequency offset of a receiver supporting ATSC 3.0 standard is disclosed. The method includes the steps of: receiving a bootstrap signal comprising a plurality of symbols; performing an autocorrelation operation on a first symbol of the plurality of symbols to generate a first correlation result; performing the autocorrelation operation on a second symbol of the plurality of symbols to generate a second correlation result; and determining the sampling frequency offset according to the first correlation result and the second correlation result.

15 Claims, 6 Drawing Sheets

METHOD FOR ESTIMATING SAMPLING FREQUENCY OFFSET OF RECEIVER, AND ASSOCIATED SIGNAL PROCESSING METHOD AND RECEIVER

BACKGROUND OF THE INVENTION

1. Field of the Invention

The present invention relates to a method for estimating a sampling frequency offset of a receiver.

2. Description of the Prior Art

A receiver within an electronic device generally has an analog-to-digital converter (ADC) to convert an analog input signal to digital input signal, for the further processing in the following circuits. However, because of the mismatch between a sampling frequency of the ADC and a data rate of the received signal, the receiver may suffer a sampling frequency offset issue, resulting in poor signal quality of the digital input signal. The conventional receiver supporting Advanced Television Systems Committee (ATSC) 3.0 generally uses pilot signals within a preamble symbol of the received signal to estimate the sampling frequency offset, however, the estimation error may become larger when the pilot signals have large intervals. Furthermore, because a signal-to-noise ratio (SNR) required by the ATSC 3.0 system is low, there will be great estimation error of the sampling frequency offset when the SNR is lower than −7 dB.

SUMMARY OF THE INVENTION

It is therefore an objective of the present invention to provide a sampling frequency offset estimation method, which uses a bootstrap signal to accurately estimate the sampling frequency offset, to solve the above-mentioned problems.

According to one embodiment of the present invention, a method for estimating a sampling frequency offset of a receiver supporting ATSC 3.0 standard is disclosed. The method comprises the steps of: receiving a bootstrap signal comprising a plurality of symbols; performing an autocorrelation operation on a first symbol of the plurality of symbols to generate a first correlation result; performing the autocorrelation operation on a second symbol of the plurality of symbols to generate a second correlation result; and determining the sampling frequency offset according to the first correlation result and the second correlation result.

According to another embodiment of the present invention, a signal processing method comprises the steps of: using an ADC to perform an analog-to-digital operation on an analog input signal to generate a digital input signal, wherein the analog input signal satisfies ATSC 3.0 standard; obtaining a bootstrap signal according to the digital input signal; determining a sampling frequency offset of the ADC according to the bootstrap signal; and using the sampling frequency offset to adjust a data signal obtained by the digital input signal.

According to another embodiment of the present invention, a receiver comprising an ADC, a bootstrap detection circuit, sampling frequency offset estimation circuit and an interpolator is disclosed. The ADC is configured to perform an analog-to-digital operation on an analog input signal to generate a digital input signal, wherein the analog input signal satisfies ATSC 3.0 standard. The bootstrap detection circuit is configured to obtain a bootstrap signal according to the digital input signal. The sampling frequency offset estimation circuit is configured to determine a sampling frequency offset of the ADC according to the bootstrap signal. The interpolator is configured to use the sampling frequency offset to adjust a data signal obtained by the digital input signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
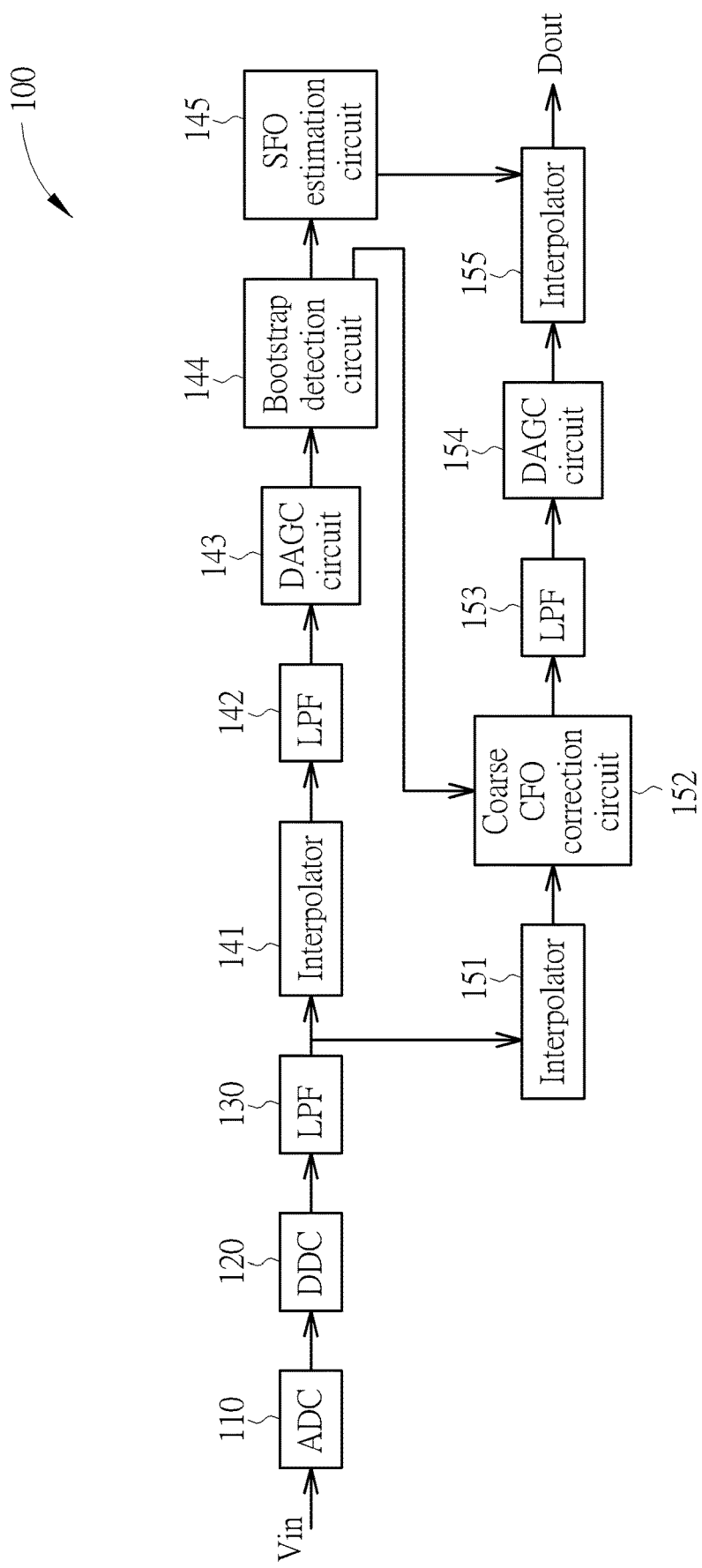
FIG. 1 is a diagram illustrating a receiver according to one embodiment of the present invention

FIG. 1 is a diagram illustrating a receiver 100 according to one embodiment of the present invention, wherein the receiver 100 supports ATSC 3.0 and within a display such as a television. As shown in FIG. 1, the receiver 100 comprises an ADC 110, a digital down converter (DDC) 120, a low-pass filter (LPF) 130, an interpolator 141, a LPF 142, a digital auto-gain control (DAGC) circuit 143, a bootstrap detection circuit 144, a sampling frequency offset estimation circuit (SFO estimation circuit) 145, an interpolator 151, a coarse carrier frequency offset (CFO) correction circuit 152, a LPF 153, a DAGC circuit 154 and an interpolator 155.

In the operations of the receiver 100, the ADC 110 performs an analog-to-digital converting operations on an analog input signal Vin to generate a digital input signal. The DDC 120 performs a down-converting operation on the digital input signal to lower the frequency of the digital input signal to generate a down-converted signal. The LPF 130 filters the down-converted signal to generate a filtered signal. In this embodiment, the filtered signal outputted by the LPF 130 comprises a bootstrap signal and a data signal (payload) that is defined by the ATSC 3.0 specification, and because the boost signal and the data signal correspond to different sampling rates, the following signal process is divided into two paths, wherein the upper path shown in FIG. 1 is for the bootstrap signal, and the lower path shown in FIG. 1 is for the data signal. Regarding the upper path, the interpolator 141 performs an interpolating operation on the filtered signal outputted by the LPF 130 to generate an interpolated signal, and the LPF 142 filters the interpolated signal to generate the bootstrap signal. The DAGC circuit 143 adjusts the strength of the bootstrap signal to generate an adjusted bootstrap signal. Then, the bootstrap detection circuit 144 decodes the adjusted bootstrap signal to generate two symbols to the SFO estimation circuit 145, and further to generate the coarse CFO information. The SFO estimation circuit 145 estimates the sampling frequency offset based on a portion of the two symbols from the bootstrap signal. In addition, regarding the lower path, the interpolator 151 performs an interpolating operation on the filtered signal outputted by the LPF 130 to generate an interpolated signal, the coarse CFO correction circuit 152 compensates the carrier frequency offset of the interpolated signal based on the coarse CFO information generated by the bootstrap detection circuit 144, and the LPF 152 filters the output of the coarse CFO correction circuit 152 to generate the data signal. The DAGC circuit 154 adjusts the strength of the data signal to generate an adjusted data signal. Finally, the interpolator 155 refers to the sampling frequency offset generated by the SFO estimation circuit 145 to perform the interpolating operation on the adjusted data signal to generate an output signal Dout to the following processing circuits.

In the embodiment shown in FIG. 1, the sampling frequency offset of the ADC 110 is estimated based on the bootstrap signal that is robust to the sampling frequency offset and the SNR, so the estimated sampling frequency offset is more accurate for the compensation of the data signal, and the output signal Dout is more suitable for the following processing.

In this embodiment, the bootstrap detection circuit 144 not only generates the received symbols of the adjusted bootstrap signal to the SFO estimation circuit 145, but also decodes the adjusted bootstrap signal to generate two symbols (hereinafter, local symbols) to the SFO estimation circuit 145, wherein the received symbols of the bootstrap signal have errors caused by the noise and the sampling frequency offset of the ADC 110, and the local symbols are considered as ideal symbols that do not have errors caused by the sampling frequency offset of the ADC 110 (because the errors are corrected by the decoding steps). Therefore, the SFO estimation circuit 145 can accurately determine the sampling frequency offset based on the received symbols and the local symbols.

Figure 2:
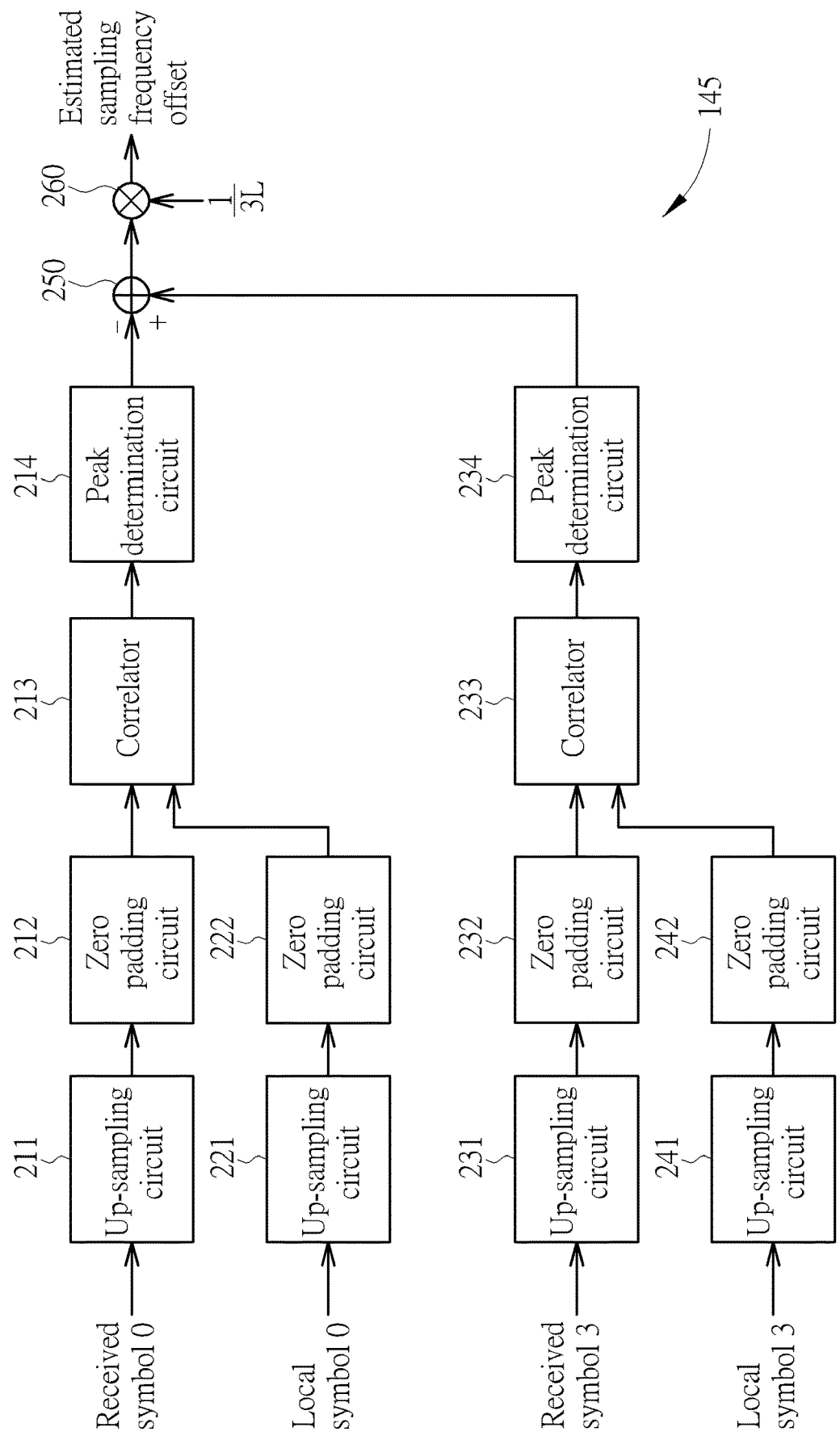
FIG. 2 is a diagram illustrating the SFO estimation circuit according to one embodiment of the present invention.
Figure 3:
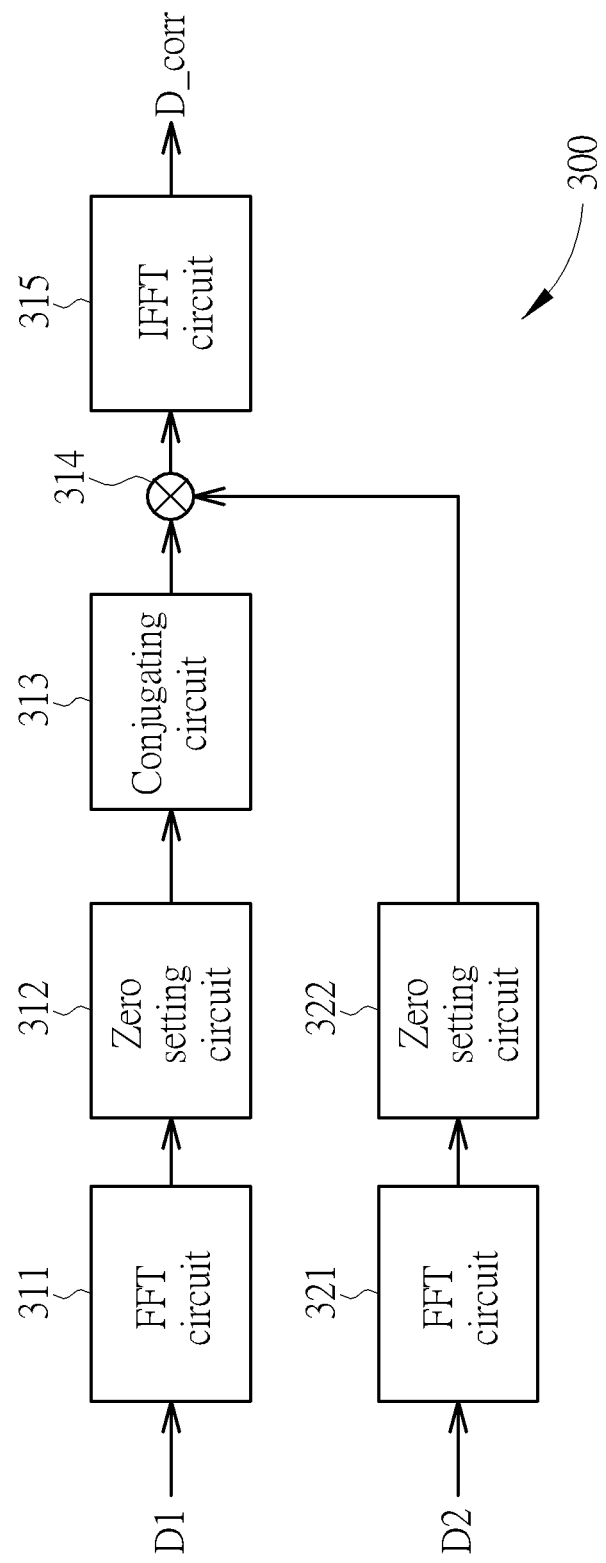
FIG. 3 is a correlator according to one embodiment of the present invention.

Specifically, FIG. 2 is a diagram illustrating the SFO estimation circuit 145 according to one embodiment of the present invention. As shown in FIG. 2, the SFO estimation circuit 145 comprises an up-sampling circuit 211, a zero padding circuit 212, an up-sampling circuit 221, a zero padding circuit 222, a correlator 213, a peak determination circuit 214, an up-sampling circuit 231, a zero padding circuit 232, an up-sampling circuit 241, a zero padding circuit 242, a correlator 233, a peak determination circuit 234, a subtractor 250 and a multiplier 260. In one embodiment, each of the correlator 213 and the correlator 233 can be implemented by a correlator 300 shown in FIG. 3, wherein the correlator 300 comprises a Fast Fourier Transform (FFT) circuit 311, a zero setting circuit 312, a conjugating circuit 313, a FFT circuit 321, a zero setting circuit 322, a multiplier 314 and an inverse FFT (IFFT) circuit 315.

Figure 4:
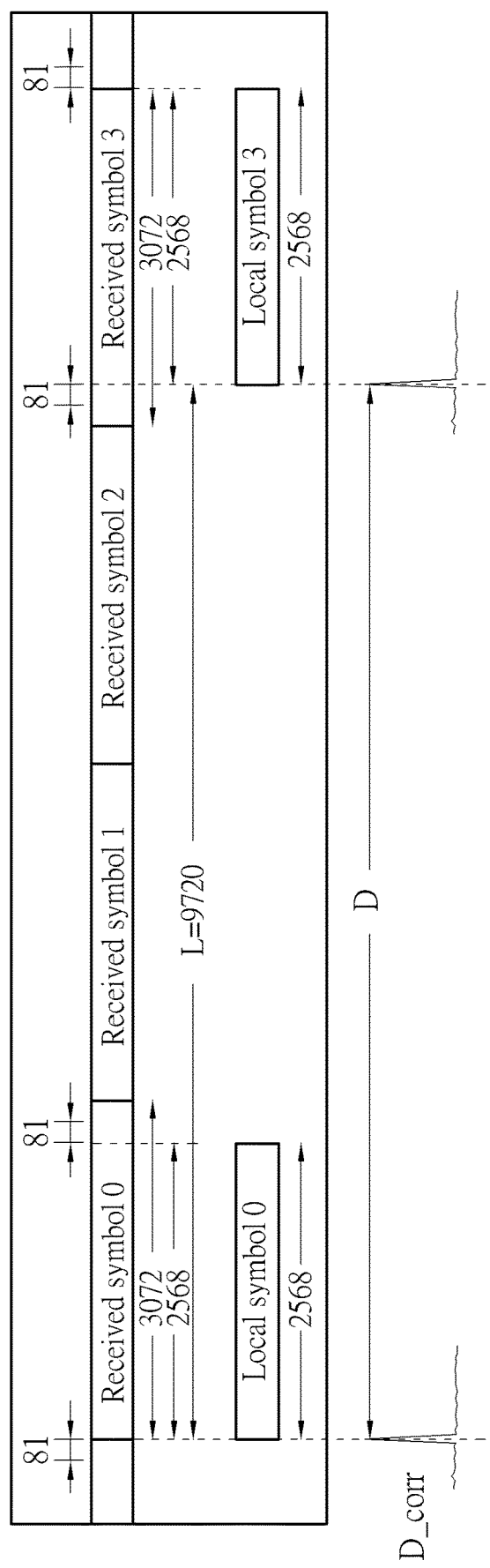
FIG. 4 shows the determination of the sampling frequency offset.

In the operations of the SFO estimation circuit 145, referring to FIG. 4 together, the bootstrap signal has four symbols (symbol 0-symbol 3), each symbol has 3072 samples (sampled bits). For the processing steps the symbol 0, initially the SFO estimation circuit 145 takes the first 2568 samples of the received symbol 0, and then takes 81 samples before and after these 2568 samples, that is the total length is 2730 samples (i.e. 81+2568+81=2730). The up-sampling circuit 211 up-samples the 2730 samples of the received symbol 0 by three to generate 8190 samples, that is the up-sampling circuit adds two zeros between each of the two adjacent samples. The zero padding circuit 212 adds two zeros at the end to the 8190 samples to generate 8192 samples. Similarly, the up-sampling circuit 221 up-samples the 2730 samples of the local symbol 0 by three to generate 8190 samples, and the zero padding circuit 222 adds two zeros at the end to the 8190 samples to generate 8192 samples. Then, the correlator 213 performs the correlating operation upon the 8192 samples corresponding to the received symbol 0 and the 8192 samples corresponding to the local symbol 0 to generate a correlation result. Taking FIG. 3 as an example, D1 serves as the 8192 samples corresponding to the received symbol 0, and D2 serves as the 8192 samples corresponding to the local symbol 0, and the FFT circuit 311 performs the fast Fourier transform on the 8192 samples corresponding to the received symbol 0 to generate a FFT result, and the zero setting circuit 312 sets the indexes $1364^{th}$ to $6826^{th}$ of the FFT result to be zero to eliminate the image signals caused by the up-sampling operation. Similarly, the FFT circuit 312 performs the fast Fourier transform on the 8192 samples corresponding to the local symbol 0 to generate a FFT result, and the zero setting circuit 322 sets the indexes $1364^{th}$ to $6826^{th}$ of the FFT result to be zero to eliminate the image signals caused by the up-sampling operation. Then, the conjugating circuit 313 conjugates the output of the zero setting circuit 312, and the multiplier 314 multiples the outputs of the conjugating circuit 313 and the zero setting circuit 322 to generate a multiplication result. Then, the IFFT circuit 315 performs the inverse fast Fourier transform on the multiplication result to generate the correlation result D_corr.

For the processing the symbol 3, initially the SFO estimation circuit 145 takes the last 2568 samples of the received symbol 3, and then takes 81 samples before and after these 2568 samples, that is the total length is 2730 samples (i.e. 81+2568+81=2730). The up-sampling circuit 231 up-samples the 2730 samples of the received symbol 3 by three to generate 8190 samples, that is the up-sampling circuit 231 adds two zeros between each of the two adjacent samples. The zero padding circuit 232 adds two zeros at the end to the 8190 samples to generate 8192 samples. Similarly, the up-sampling circuit 241 up-samples the 2730 samples of the local symbol 3 by three to generate 8190 samples, and the zero padding circuit 242 adds two zeros at the end to the 8190 samples to generate 8192 samples. Then, the correlator 233 performs the correlating operation upon the 8192 samples corresponding to the received symbol 0 and the 8192 samples corresponding to the local symbol 0 to generate a correlation result. Taking FIG. 3 as an example, D1 serves as the 8192 samples corresponding to the received symbol 3, and D2 serves as the 8192 samples corresponding to the local symbol 3, and the FFT circuit 311 performs the fast Fourier transform on the 8192 samples corresponding to the received symbol 3 to generate a FFT result, and the zero setting circuit 312 sets the indexes $1364^{th}$ to $6826^{th}$ of the FFT result to be zero to eliminate the image signals caused by the up-sampling operation. Similarly, the FFT circuit 312 performs the fast Fourier transform on the 8192 samples corresponding to the local symbol 3 to generate a FFT result, and the zero setting circuit 322 sets the indexes $1364^{th}$ to $6826^{th}$ of the FFT result to be zero to eliminate the image signals caused by the up-sampling operation. Then, the conjugating circuit 313 conjugates the output of the zero setting circuit 312, and the multiplier 314 multiples the outputs of the conjugating circuit 313 and the zero setting circuit 322 to generate a multiplication result. Then, the IFFT circuit 315 performs the inverse fast Fourier transform on the multiplication result to generate the correlation result D_corr.

The absolute values of the correlation result D_corr of the symbol 0 and the symbol 3 can refer to FIG. 4, that is the correlation result D_corr corresponding to the symbol 0 has one peak, and the correlation result D_corr corresponding to the symbol 3 also has one peak. The peak determination circuit 214 determines the position of the peak of the correlation result D_corr corresponding to the symbol 0 to generate a first peak position, and the peak determination circuit 234 determines the position of the peak of the correlation result D_corr corresponding to the symbol 3 to generate a second peak position. Then, the subtractor 250 subtracts the first peak position by the second peak position to determine a distance D, and the multiplier 260 multiples the distance D with (⅓*L) to generate the sampling frequency offset, where "L" is a distance between the first sample of the symbol 0 and the first sample of the symbol 3 (i.e., L=9720).

It is noted that the up-sampling circuits 211/221/231/241 are used to increase the recognition of the calculating steps of the sampling frequency offset, and the up-sampling circuits 211/221/231/241 can be removed from the SFO estimation circuit 145 without influencing the operations. In addition, once the up-sampling circuits 211/221/231/241 are removed from the SFO estimation circuit 145, the zero padding circuits 212/222/232/242 are also removed from the SFO estimation circuit 145, and the factor "⅓L" of the multiplier 260 becomes "L".

In the above embodiment, the correlator 213/233 can be regarded as performing autocorrelation operation on the symbol 0 and the symbol 3, respectively; and the correlator 213/233 are can be regarded as performing time domain correlation operation on the symbol 0 and the symbol 3, respectively.

In the above embodiment, the symbol 0 and the symbol 3 are used to determine the sampling frequency offset. In other embodiments, however, any two of the symbols (e.g. symbol 0 and symbol 2) can be used to determine the sampling frequency offset based on the similar operations. These alternative designs shall fall within the scope of the present invention.

Figure 5:
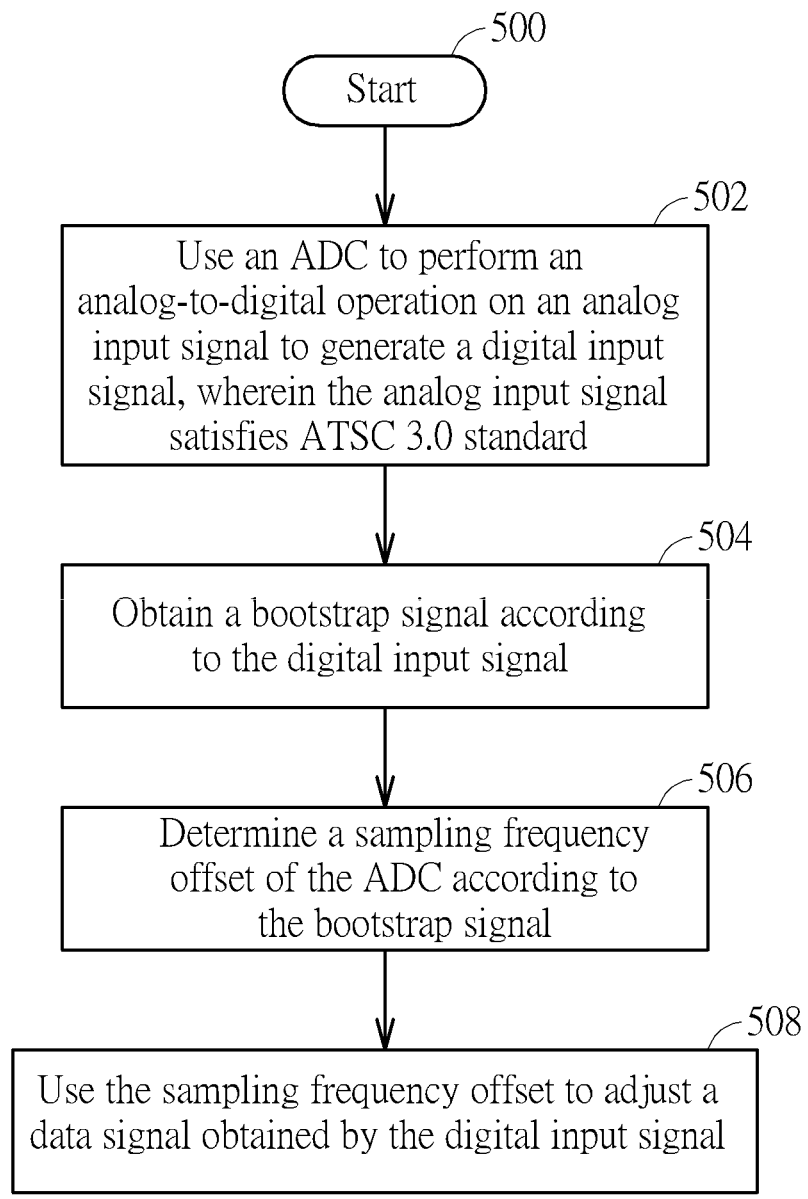
FIG. 5 is a flowchart of a signal processing method of the receiver according to one embodiment of the present invention.

FIG. 5 is a flowchart of a signal processing method of the receiver 100 according to one embodiment. Referring to the above embodiment, the flow of the signal processing method is described as follows.

Step 500: the flow starts.

Step 502: use an ADC to perform an analog-to-digital operation on an analog input signal to generate a digital input signal, wherein the analog input signal satisfies ATSC 3.0 standard.

Step 504: obtain a bootstrap signal according to the digital input signal.

Step 506: determine a sampling frequency offset of the ADC according to the bootstrap signal.

Step 508: use the sampling frequency offset to adjust a data signal obtained by the digital input signal.

Figure 6:
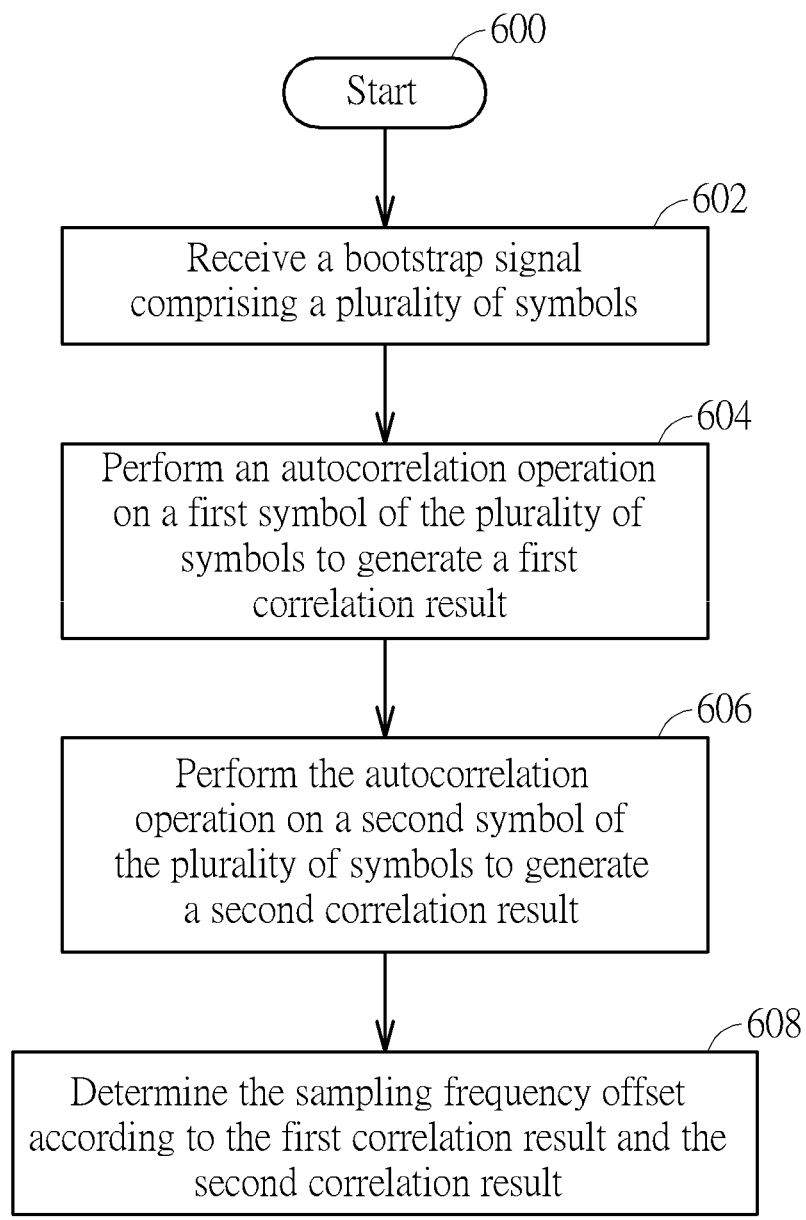
FIG. 6 is a flowchart of a method for estimating the sampling frequency offset of the receiver according to one embodiment of the present invention.

FIG. 6 is a flowchart of a method for estimating the sampling frequency offset of the receiver 100 (i.e. the step 506 shown in FIG. 5) according to one embodiment of the present invention. Referring to the above embodiment, the flow of the method for estimating the sampling frequency offset is described as follows.

Step 600: the flow starts.

Step 602: receive a bootstrap signal comprising a plurality of symbols.

Step 604: perform an autocorrelation operation on a first symbol of the plurality of symbols to generate a first correlation result.

Step 606: perform the autocorrelation operation on a second symbol of the plurality of symbols to generate a second correlation result.

Step 608: determine the sampling frequency offset according to the first correlation result and the second correlation result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for estimating a sampling frequency offset of a receiver, comprising:
   receiving a bootstrap signal comprising a plurality of symbols;
   performing an autocorrelation operation on a first symbol of the plurality of symbols to generate a first correlation result;
   performing the autocorrelation operation on a second symbol of the plurality of symbols to generate a second correlation result; and
   determining the sampling frequency offset according to the first correlation result and the second correlation result;
   wherein the step of performing the autocorrelation operations on the first symbol of the plurality of symbols to generate the first correlation result comprises:
     generating a local first symbol according to the received first symbol of the bootstrap signal; and
     correlating the received first symbol with the local first symbol to generate the first correlation result.

2. The method of claim 1, wherein the step of performing the autocorrelation operations on the first symbol of the plurality of symbols to generate the first correlation result further comprises:
   up-sampling the received first symbol to generate an up-sampled received first symbol; and
   up-sampling the local first symbol to generate an up-sampled local first symbol; and
   the step of correlating the received first symbol with the local first symbol to generate the first correlation result comprises:
     correlating the up-sampled received first symbol with the up-sampled local first symbol to generate the first correlation result.

3. The method of claim 1, wherein the step of performing the autocorrelation operations on the second symbol of the plurality of symbols to generate the second correlation result comprises:
   generating a local second symbol according to the received second symbol of the bootstrap signal; and
   correlating the received second symbol with the local second symbol to generate the second correlation result.

4. The method of claim 3, wherein the step of determining the sampling frequency offset according to the first correlation result and the second correlation result comprises:
   determining a first peak of the first correlation result;
   determining a second peak of the second correlation result;
   calculating a distance between the first peak and the second peak; and
   calculating the sampling frequency offset according to the distance between the first peak and the second peak.

5. The method of claim 1, wherein the bootstrap signal comprises four symbols, and the first symbol is a start symbol of the bootstrap signal, and the second symbol is a last symbol of the bootstrap signal.

6. The method of claim 1, wherein the autocorrelation operation is a time domain correlation operation.

7. A signal processing method, comprising:
using an analog-to-digital converter (ADC) to perform an analog-to-digital operation on an analog input signal to generate a digital input signal;
obtaining a bootstrap signal according to the digital input signal;
determining a sampling frequency offset of the ADC according to the bootstrap signal; and
using the sampling frequency offset to adjust a data signal obtained by the digital input signal;
wherein the step of determining the sampling frequency offset of the ADC according to the bootstrap signal comprises:
performing an autocorrelation operation on a first symbol of the bootstrap signal to generate a first correlation result;
performing the autocorrelation operation on a second symbol of the bootstrap signal to generate a second correlation result; and
determining the sampling frequency offset according to the first correlation result and the second correlation result; and
the step of performing the autocorrelation operations on the first symbol of the bootstrap signal to generate the first correlation result comprises:
generating a local first symbol according to the received first symbol of the bootstrap signal; and
correlating the received first symbol with the local first symbol to generate the first correlation result.

8. The signal processing method of claim 7, wherein the step of performing the autocorrelation operations on the first symbol of bootstrap signal to generate the first correlation result further comprises:
up-sampling the received first symbol to generate an up-sampled received first symbol; and
up-sampling the local first symbol to generate an up-sampled local first symbol; and
the step of correlating the received first symbol with the local first symbol to generate the first correlation result comprises:
correlating the up-sampled received first symbol with the up-sampled local first symbol to generate the first correlation result.

9. The signal processing method of claim 7, wherein the step of performing the autocorrelation operations on the second symbol of the bootstrap signal to generate the second correlation result comprises:
generating a local second symbol according to the received second symbol of the bootstrap signal; and
correlating the received second symbol with the local second symbol to generate the second correlation result.

10. The signal processing method of claim 9, wherein the step of determining the sampling frequency offset according to the first correlation result and the second correlation result comprises:
determining a first peak of the first correlation result;
determining a second peak of the second correlation result;
calculating a distance between the first peak and the second peak; and
calculating the sampling frequency offset according to the distance between the first peak and the second peak.

11. The signal processing method of claim 7, wherein the bootstrap signal comprises four symbols, and the first symbol is a start symbol of the bootstrap signal, and the second symbol is a last symbol of the bootstrap signal.

12. The signal processing method of claim 7, wherein the autocorrelation operation is a time domain correlation operation.

13. A receiver, comprising:
an analog-to-digital converter (ADC), configured to perform an analog-to-digital operation on an analog input signal to generate a digital input signal;
a bootstrap detection circuit, configured to obtain a bootstrap signal according to the digital input signal;
a sampling frequency offset estimation circuit, configured to determine a sampling frequency offset of the ADC according to the bootstrap signal; and
an interpolator, configured to use the sampling frequency offset to adjust a data signal obtained by the digital input signal;
wherein the sampling frequency offset estimation circuit performs an autocorrelation operation on a first symbol of the bootstrap signal to generate a first correlation result, and performs the autocorrelation operation on a second symbol of the bootstrap signal to generate a second correlation result, and determines the sampling frequency offset according to the first correlation result and the second correlation result;
wherein the sampling frequency offset estimation circuit generates a local first symbol according to the received first symbol of the bootstrap signal, and correlates the received first symbol with the local first symbol to generate the first correlation result.

14. The receiver of claim 13, wherein the sampling frequency offset estimation circuit generates a local second symbol according to the received second symbol of the bootstrap signal, and correlates the received second symbol with the local second symbol to generate the second correlation result.

15. The receiver of claim 14, wherein the sampling frequency offset estimation circuit determines a first peak of the first correlation result, determines a second peak of the second correlation result, calculates a distance between the first peak and the second peak, and calculating the sampling frequency offset according to the distance between the first peak and the second peak.

* * * * *